(12) United States Patent
Falcati et al.

(10) Patent No.: US 7,286,077 B2
(45) Date of Patent: Oct. 23, 2007

(54) METHOD AND DEVICE FOR AIDING THE LANDING OF AN AIRCRAFT ON A RUNWAY

(75) Inventors: Michel Falcati, Monferran Saves (FR); Gilles Tatham, La Salvetat Saint Gilles (FR)

(73) Assignee: Airbus France, Toulouse (FR)

( * ) Notice: Subject to any disclaimer, the term of this patent is extended or adjusted under 35 U.S.C. 154(b) by 137 days.

(21) Appl. No.: 11/108,116

(22) Filed: Apr. 18, 2005

(65) Prior Publication Data

US 2005/0237235 A1 Oct. 27, 2005

(30) Foreign Application Priority Data

Apr. 22, 2004 (FR) .................................. 04 04268

(51) Int. Cl.
*G05D 1/08* (2006.01)
(52) U.S. Cl. .............................. 342/33; 342/35; 342/63; 342/146; 342/357.08; 701/16
(58) Field of Classification Search ................... 342/33
See application file for complete search history.

(56) References Cited

U.S. PATENT DOCUMENTS

| | | | |
|---|---|---|---|
| 3,662,392 A | | 5/1972 | Stapleton et al. |
| 4,667,196 A | * | 5/1987 | Kaul ........................... 340/954 |
| 4,894,655 A | * | 1/1990 | Joguet et al. ................ 340/988 |
| 5,361,212 A | | 11/1994 | Class et al. |
| 5,661,486 A | * | 8/1997 | Faivre et al. .................. 342/33 |
| 5,677,685 A | * | 10/1997 | Coirier et al. ............... 340/979 |
| 5,748,136 A | * | 5/1998 | Fischer ......................... 342/33 |
| 5,820,080 A | | 10/1998 | Eschenbach |
| 5,825,021 A | * | 10/1998 | Uemura .................... 250/222.1 |
| 6,157,876 A | * | 12/2000 | Tarleton et al. ............... 701/16 |
| 6,178,363 B1 | * | 1/2001 | McIntyre et al. ............. 701/16 |
| 6,239,745 B1 | | 5/2001 | Stratton |
| 6,711,479 B1 | * | 3/2004 | Staggs ......................... 701/16 |
| 2002/0116097 A1 | * | 8/2002 | Block et al. ................... 701/9 |
| 2003/0105580 A1 | * | 6/2003 | Walter ........................ 701/120 |
| 2004/0183698 A1 | * | 9/2004 | Rouquette et al. .......... 340/972 |

* cited by examiner

*Primary Examiner*—Thomas H. Tarcza
*Assistant Examiner*—Matthew Barker
(74) *Attorney, Agent, or Firm*—Stevens, Davis, Miller & Mosher, LLP

(57) ABSTRACT

A system for aiding the landing of an aircraft on a runway uses an angular vertical position of the aircraft and includes at least one landing aid radio. In a stand-alone manner, the position of the aircraft in latitude and longitude is determined, and the position of the threshold of the runway in latitude and longitude is determined. A computing unit corrects, on the basis of positions of the aircraft and of the threshold of the runway, the angular vertical position of the aircraft. The corrected angular vertical position is used to aid the landing of the aircraft.

16 Claims, 3 Drawing Sheets

METHOD AND DEVICE FOR AIDING THE LANDING OF AN AIRCRAFT ON A RUNWAY

FIELD OF THE INVENTION

The present invention relates to a method and device for aiding the landing of an aircraft on a runway.

More precisely, it relates to a method (and to a device) employing at least one landing aid radio means and using an angular vertical position of the aircraft. The landing aid is considered to comprise aid on approach, on landing proper and also on rollout.

BACKGROUND OF THE RELATED ART

As landing aid radio means, both for manual landing and for automatic landing, various radionavigation systems are known, in particular a microwave landing system of MLS type or an instrument landing system of ILS type. The operational requirements make it necessary to employ an MLS type or ILS type system which makes it possible to perform landings regardless of the climatic conditions and to comply with the demands imposed by international standards.

It is known that the main constraints that are related to the types of approach and to the constraints of installing the antennas on an aircraft are the following constraints:

- a so-called 19-feet (or 5.8-meter) rule in the final phase of the approach (representing the vertical deviation between the trajectory passing through the reception antenna and the trajectory passing beneath the main undercarriage) which is a demand imposed by international standards;
- the shape of the radiation patterns of the antennas and the potential masking of the antennas possibly related to fixed or moving obstacles such as the undercarriages, but also to the attitudes of the aircraft throughout the approach phase; and
- the deviation between the heading of the aircraft and the heading of the runway, which is significant at the start of the approach.

To satisfy all the aforesaid constraints during a landing, it is primarily necessary to install an antenna on the upper part of the aircraft, so as to guarantee the reception of a radio signal during an approach with significant angles of capture of the axis of the runway (this signal is used to compute the position of the airplane with respect to the approach axis). Moreover, to comply with the 19-feet rule, it is necessary to use an antenna installed on the lower part of the aircraft so as to have a vertical deviation, between the trajectory passing through this antenna and that passing through the lowest point of the main undercarriage, which is less than 19 feet (or around 5.8 meters).

To comply with the above two constraints, the installation becomes complex or even impossible for aircraft, the diameter and the length of whose fuselage are significant.

In addition to the aforesaid constraints related to the installation of the antennas on the aircraft, there are also constraints related to the radionavigation receivers. A first constraint is that an "MLS" type system for example works with angular values and a second constraint is that in order to be able to correct, on the basis of a fixed and constant metric value, the vertical position of the aircraft, the receiver must necessarily know the position of the aircraft with respect to the threshold of the runway, so as to transform a metric correction into an angular correction.

SUMMARY OF THE INVENTION

The present invention relates to a method of aiding the landing of an aircraft on a runway, making it possible to remedy these drawbacks.

To this end, according to the invention, said method of the type employing at least one landing aid radio means and using an angular vertical position of the aircraft, is noteworthy in that the following operations are carried out automatically and repetitively:

a) the position of the aircraft in latitude and longitude is determined in a stand-alone manner;

b) the position of the threshold of said runway in latitude and longitude is determined;

c) on the basis of the positions determined in steps a) and b), a first distance corresponding to the distance in a horizontal plane between the aircraft and the threshold of the runway is computed;

d) to this first distance is added the distance in a horizontal plane between a predetermined ground reference point and said threshold of the runway so as to form a second distance;

e) with the aid of this second distance and of the value of the measured approach slope of the aircraft, a first height corresponding to the relative height of the aircraft with respect to the threshold of the runway is computed;

f) a predetermined metric deviation is subtracted from said first height so as to form a second height; and g) on the basis of said second height and of said second distance, said angular vertical position of the aircraft is corrected, the angular vertical position thus corrected being used to aid the landing of the aircraft.

According to the invention, said predetermined metric deviation used in step f) makes it possible to comply with a 19-feet rule.

Thus, by virtue of the invention, the following advantages are obtained:

- a single antenna makes it possible to comply with all the aforesaid constraints, if its installation makes it possible to guarantee correct and sufficient reception of the radio signal for aiding guidance throughout landing;
- on very large wide-bodied aircraft, the present invention makes it possible to satisfy the "19-feet rule" easily;
- the present invention can be adapted automatically to all aircraft, without modification or with minor modifications of the landing aid radio means;
- the problems of installing the antennas, at the lower part of the aircraft, are eliminated; and
- it is no longer necessary to develop and fine-tune algorithms for switching between the various antennas.

Advantageously:

in step a), the position of the aircraft is determined with the aid of a GPS receiver aboard said aircraft, that is to say a receiver of a GPS ("Global Positioning System") type satellite positioning system; and/or said ground reference point used in step d) corresponds to the origin point, on the runway, of the approach slope.

In a preferred embodiment, in step e), said first height H1 is computed with the aid of the following expression:

$$H1 = D1 \cdot \tan \alpha$$

in which:

$\alpha$ is the value of the approach slope measured by the receiver of the landing system;

$\tan \alpha$ is the tangent of $\alpha$; and

D1 represents said second distance.

Furthermore, advantageously, in step g), said corrected angular position is computed with the aid of the following expression:

$$\alpha 1 = \arctan[(H1-H2)/D1]$$

in which H1 and D1 represent the magnitudes specified above and, H2 represents said predetermined metric deviation.

Additionally:
- in a first embodiment, said landing aid radio means comprises a receiver of a microwave landing system, preferably of MLS ("Microwave Landing System") type, and said receiver receives the position of the threshold of the runway from a ground station (step b);
- in a second embodiment, said landing aid radio means comprises a receiver of a microwave landing system, preferably of MLS ("Microwave Landing System") type, and said position of the threshold of the runway is output by a database aboard the aircraft; and
- in a third embodiment, said landing aid radio means comprises a receiver of an instrument landing system, preferably of ILS ("Instrument Landing System") type, and said position of the threshold of the runway is output by a database aboard the aircraft.

The present invention also relates to a device for aiding the landing of an aircraft on a runway, said device comprising at least one landing aid radio means and using an angular vertical position of the aircraft.

According to the invention, said device is noteworthy in that it moreover comprises:
- first means for determining in a stand-alone manner the position of the aircraft in latitude and longitude;
- second means for determining the position of the threshold of said runway in latitude and Longitude; and
- a computing unit for, on the basis of said positions of the aircraft and of the threshold of the runway, correcting said angular vertical position of the aircraft, the angular vertical position thus corrected being used to aid the landing of the aircraft.

In a particular embodiment, said first means comprise a GPS receiver aboard the aircraft, that is to say a receiver of a GPS ("Global Positioning System") type satellite positioning system.

Furthermore:
- in a first variant, said second means comprise a receiver aboard the aircraft and cooperating with a ground station; and
- in a second variant, said second means comprise a database.

Additionally:
- in a first embodiment, said landing aid radio means comprises a receiver of a microwave landing system, by preferably of MLS type; and
- in a second embodiment, said landing aid radio means comprises a receiver of an instrument landing system, preferably of ILS type.

Additionally, in a particular embodiment, the device according to the invention comprises a landing aid multimode receiver which comprises at least:
- said landing aid radio means;
- said first means; and
- said computing unit.

The figures of the appended drawing will elucidate the manner in which the invention may be embodied. In these figures, identical references designate similar elements.

DETAILED DESCRIPTION OF THE INVENTION

Figure 1:
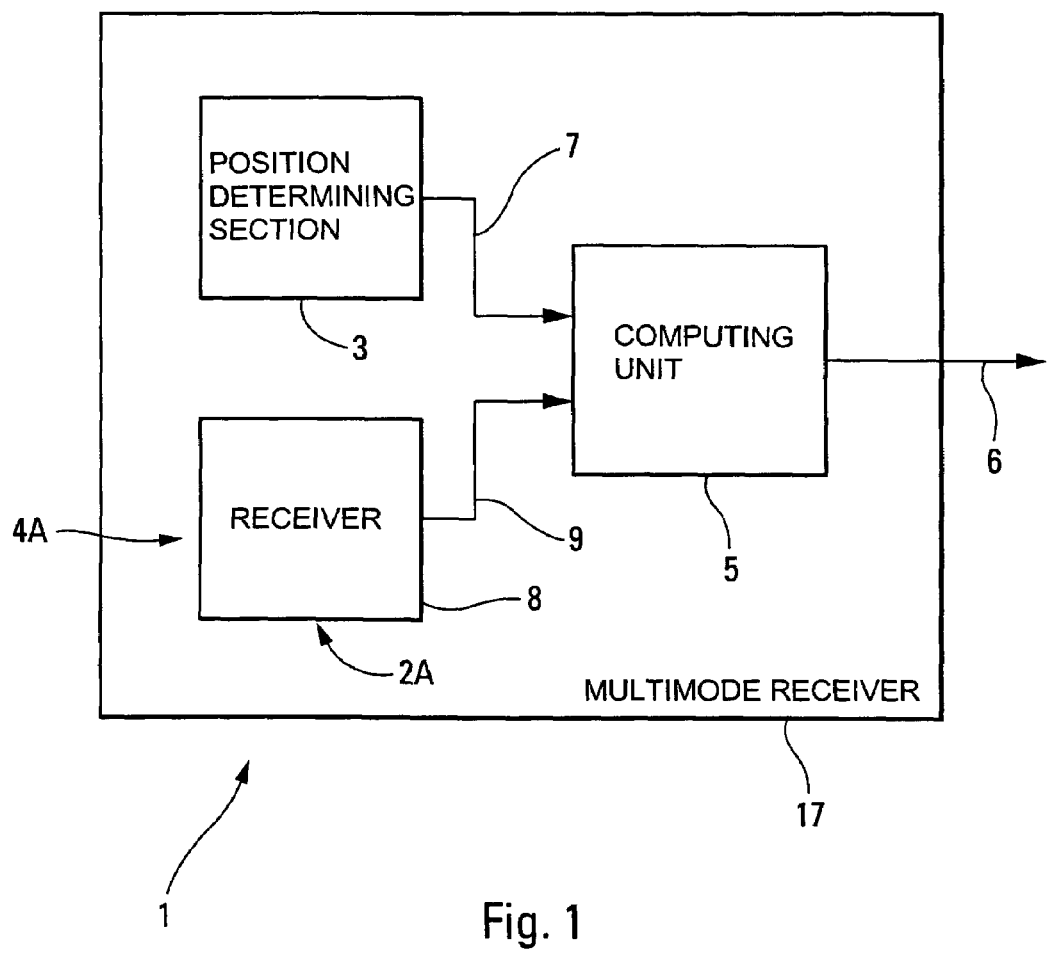
FIGS. 1 to 3 are the schematic diagrams of three different embodiments of a device in accordance with the invention.

The device 1 in accordance with the invention is a device for aiding the landing of an aircraft on a runway.

Said device 1 is of the type comprising at least one customary landing aid radio means 2A, 2B, and using an angular vertical position of the aircraft.

Furthermore, according to the invention, said device 1 moreover comprises:
- first means 3 for determining in a stand-alone manner the position of the aircraft in latitude and longitude;
- second means 4A, 4B, 4C for determining the position of the threshold of said runway in latitude and longitude;
- a computing unit 5 for, on the basis of said positions of the aircraft and of the threshold of the runway, correcting said angular vertical position of the aircraft, the angular vertical position thus corrected being transmitted via a link 6 and used to aid the landing of the aircraft.

Hence, according to the invention, said computing unit 5 carries out the following operations:
- on the basis of the aforesaid positions of the aircraft and of the threshold of the runway, it computes a first distance corresponding to the distance in a horizontal plane between the aircraft and the threshold of the runway;
- to this first distance it adds the distance in a horizontal plane between a predetermined ground reference point and said threshold of the runway so as to form a second distance. According to the invention, said ground reference point corresponds to the point of origin, on the runway, of the approach slope;
- with the aid of this second distance and of the value of the measured approach slope of the aircraft, it computes a first height corresponding to the relative height of the aircraft with respect to the threshold of the runway;
- it subtracts a predetermined metric deviation making it possible to comply with the 19-feet rule from said first height so as to form a second height; and
- on the basis of said second height and of said second distance, it corrects said angular vertical position of the aircraft, the angular vertical position thus corrected therefore being used to aid the landing of the aircraft.

In a preferred embodiment, said computing unit 5 computes:

said first height H1 with the aid of the following expression:

$$H1 = D1 \cdot \tan \alpha$$

in which:
- $\alpha$ is the value of the approach slope measured by the receiver of the landing system;
- $\tan \alpha$ is the tangent of $\alpha$; and
- D1 represents said second distance; and said corrected angular position with the aid of the expression:

$$\alpha 1 = \arctan[(H1-H2)/D1]$$

in which H1 and D1 represent the magnitudes specified above and, H2 represents said predetermined metric deviation.

Figure 2:
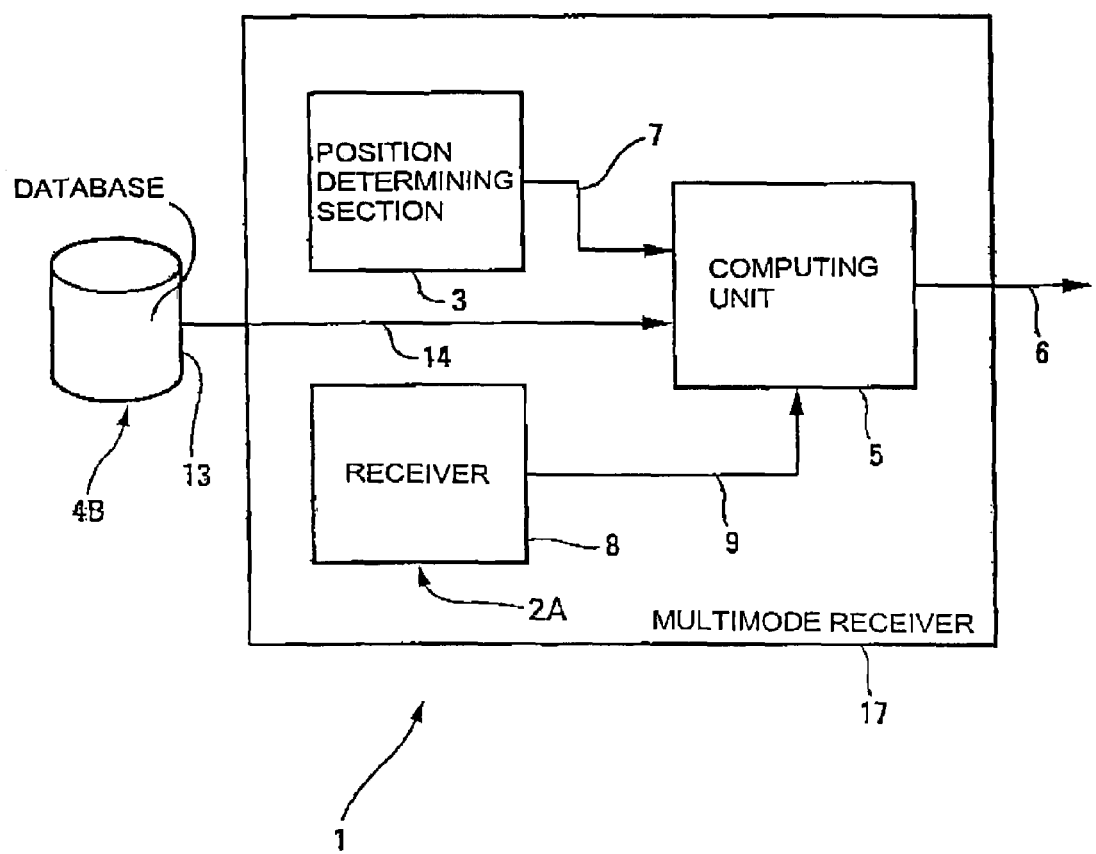

In a particular embodiment, said first means 3 which are connected by a link 7 to the computing unit 5, comprise a customary GPS receiver aboard the aircraft, that is to say a receiver of a GPS ("Global Positioning System") type satellite positioning system. Additionally:

in a first variant represented in FIGS. 1 and 2, said landing aid radio means 2A comprises a receiver 8 of a microwave landing system, preferably of MLS type, which is connected by a link 9 to the computer unit 5. A microwave (or RF) landing system is a landing system which operates in the microwave spectrum and which provides lateral and vertical guidance for aircraft equipped with compatible instruments; and in a second variant represented in FIG. 3, said landing aid radio means 2B comprises a receiver 11 of an instrument landing system, preferably of ILS type, which is connected by a link 12 to the computing unit 5. An instrument landing system is a radionavigation system which is composed of automatic beacons situated at the edge of the runway and of a specialized radio receiver aboard the aircraft, which provides horizontal and vertical guidance before and during landing by presenting the pilot with the lateral deviation with respect to the axis of the runway and the vertical deviation with respect to a descent plane.

Additionally, in a first embodiment represented in FIG. 1, said second means 4A comprise said receiver 8 which receives the position of the threshold of the runway, in customary manner, from a station (not represented) which is situated on the ground.

In a second embodiment represented in FIG. 2, said second means 4B comprise a database 13 aboard the aircraft and connected by a link 14 to the computing unit 5, from which said position of the threshold of the runway is output.

Figure 3:
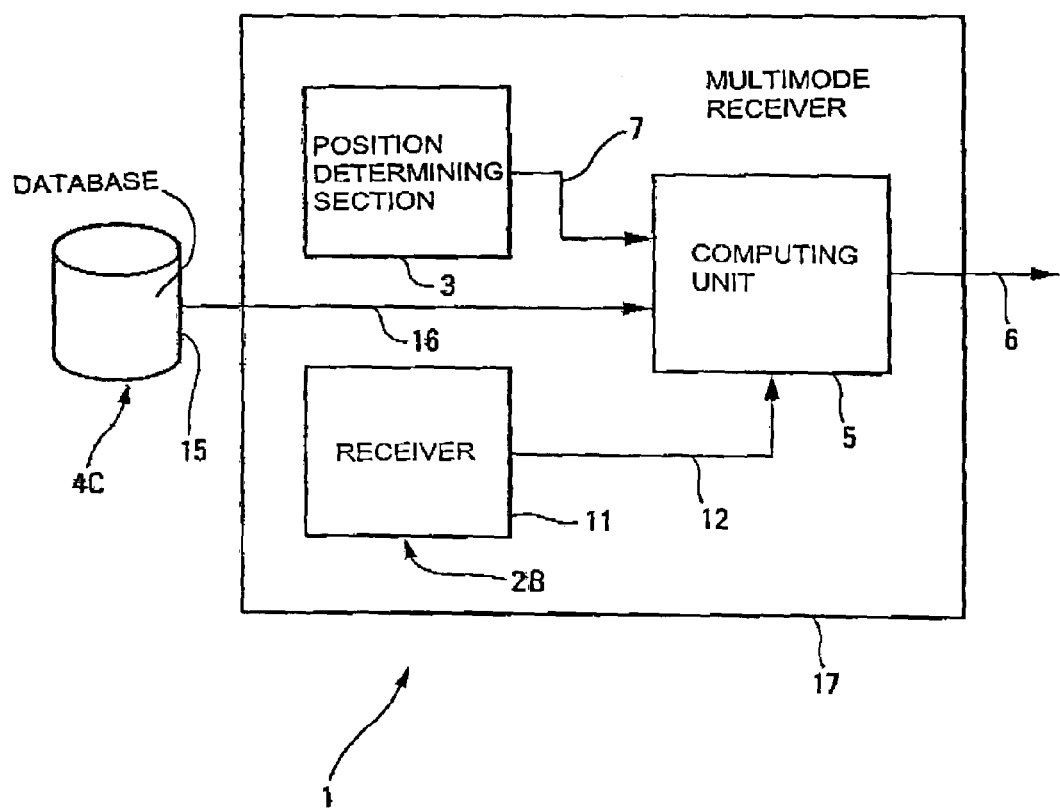

In a third embodiment represented in FIG. 3, said second means 4C comprise a database 15 aboard the aircraft and connected by a link 16 to the computing unit 5, from which said position of the threshold of the runway is output.

Preferably, said database 13, 15 constitutes part of an FMS ("Flight Management System") type flight management system.

Additionally, in a particular embodiment, the device 1 in accordance with the invention comprises a landing aid multimode receiver 17 of MMR ("Multi Mode Receiver") type, which comprises at least:

said landing aid radio means 2A, 2B;
said first means 3; and
said computing unit 5.

Thus, by virtue of the device 1 in accordance with the invention, the following advantages are obtained:

a single antenna makes it possible to comply with all the aforesaid constraints, if its installation makes it possible to guarantee correct and sufficient reception of the radio signal for aiding guidance throughout landing;

on very large wide-bodied aircraft, the device 1 makes it possible to satisfy the "19-feet rule" easily;

the device 1 can be adapted automatically to all aircraft, without modification or with minor modifications of the landing aid radio means 2A, 2B;

the problems of installing the antennas, at the lower part of the aircraft, are eliminated by said device 1; and it is no longer necessary to develop and fine-tune algorithms for switching between the various antennas.

The invention claimed is:

1. A method of aiding the landing of an aircraft on a runway, said method employing at least one landing aid radio unit and using an angular vertical position of the aircraft, wherein the following operations are carried out in sequence automatically and repetitively:

a) determining the position of the aircraft in latitude and longitude in a stand-alone manner;

b) determining the position of the threshold of said runway in latitude and longitude;

c) on the basis of the positions determined in steps a) and b), a first distance corresponding to the distance in a horizontal plane between the aircraft and the threshold of the runway is computed;

d) adding to this first distance the distance in a horizontal plane between a predetermined ground reference point and said threshold of the runway so as to form a second distance;

e) with the aid of this second distance and of the value of a measured approach slope of the aircraft, computing a first height corresponding to the relative height of the aircraft with respect to the threshold of the runway;

f) subtracting a predetermined metric deviation from said first height so as to form a second height; and g) on the basis of said second height and of said second distance, correcting said angular vertical position of the aircraft, the angular vertical position thus corrected being used to aid the landing of the aircraft.

2. The method as claimed in claim 1, wherein said predetermined metric deviation used in step f) makes it possible to comply with a 19-feet rule.

3. The method as claimed in claim 1, wherein in step a), the position of the aircraft is determined with the aid of a GPS receiver aboard said aircraft.

4. The method as claimed in claim 1, wherein said ground reference point used in step d) corresponds to the origin point, on the runway, of the approach slope.

5. The method as claimed in claim 1, wherein in step e), said first height H1 is computed with the aid of the following expression:

$$H1 = D1 \cdot \tan \alpha$$

in which:

$\alpha$ is the value of the approach slope measured by the receiver of the landing system;

$\tan \alpha$ is the tangent of $\alpha$; and

D1 represents said second distance.

6. The method as claimed in claim 5, wherein in step g), said corrected angular position is computed with the aid of the following expression:

$$\alpha 1 = \arctan\,[(H1-H2)/D1]$$

in which H1 and D1 represent the magnitudes specified in claim 5 and, H2 represents said predetermined metric deviation.

7. The method as claimed in claim 1, wherein said landing aid radio unit comprises a receiver of a microwave landing system and wherein said receiver receives the position of the threshold of the runway from a ground station.

8. The method as claimed in claim 1, wherein said landing aid radio unit comprises a receiver of a microwave landing system and wherein said position of the threshold of the runway is output by a database aboard the aircraft.

9. The method as claimed in claim 1, wherein said landing aid radio unit comprises a receiver of an instrument landing system and wherein said position of the threshold of the runway is output by a database (15) aboard the aircraft.

10. A device for aiding the landing of an aircraft on a runway, said device comprising at least one landing aid radio unit and using an angular vertical position of the aircraft, said device further comprises:

a first section for determining in a stand-alone manner the position of the aircraft in latitude and longitude;

a second section for determining the position of the threshold of said runway in latitude and longitude; and a computing unit for, on the basis of said positions of the aircraft and of the threshold of the runway, correcting said angular vertical position of the aircraft, the angular vertical position thus corrected being used to aid the landing of the aircraft, wherein said computing unit comprises:

a computing section for computing, on the basis of positions of the aircraft and of the threshold of the runway, a first distance corresponding to the distance in a horizontal plane between the aircraft and the threshold of the runway;

an addition section for adding to said first distance a distance in a horizontal plane between a predetermined ground reference point and said threshold of the runway so as to form a second distance;

a computing section for computing, with the aid of said second distance and of the value of the measured approach slope of the aircraft, a first height corresponding to a relative height of the aircraft with respect to the threshold of the runway;

a subtraction section for subtracting a predetermined metric deviation from said first height so as to form a second height; and a correction section for correcting, on the basis of said second height and of said second distance, said angular vertical position of the aircraft, the corrected angular vertical position being used to aid landing of the aircraft.

11. The device as claimed in claim 10, wherein said first section comprises a GPS receiver aboard the aircraft.

12. The device as claimed in claim 10, wherein said second section comprises a receiver aboard the aircraft, cooperating with a ground station.

13. The device as claimed in claim 10, wherein said second section comprises a database.

14. The device as claimed in claim 10, wherein said landing aid radio section comprises a receiver of a microwave landing system.

15. The device as claimed in claim 10, wherein said landing aid radio section comprises a receiver of an instrument landing system.

16. The device as claimed in claim 10, which comprises a landing aid multimode receiver which comprises at least: said landing aid radio section; said first section; and said computing unit.

* * * * *